United States Patent [19]

Yesuratnam

[11] 4,292,753
[45] Oct. 6, 1981

[54] FISH LANDING NET

[76] Inventor: Richard J. Yesuratnam, Apt. 15, 9002 Manchester Rd., Silver Spring, Md. 20901

[21] Appl. No.: 155,240

[22] Filed: Jun. 2, 1980

[51] Int. Cl.³ .............................................. A01K 77/00
[52] U.S. Cl. ................................................ 43/5; 43/7; 43/11
[58] Field of Search ................ 9/14; 43/5, 7, 11, 17.2, 43/42.7, 60, 102, 105; 294/66 R, 67 DA, 67 DB, 73

[56] References Cited

U.S. PATENT DOCUMENTS

| | | | |
|---|---|---|---|
| 1,797,251 | 3/1931 | Tyrrell | 43/5 |
| 2,626,477 | 1/1953 | Richardson | 43/5 |
| 2,782,546 | 2/1957 | Edworthy | 43/11 |
| 2,921,397 | 1/1960 | Luthi | 43/7 |
| 3,363,355 | 1/1968 | Kellner | 43/5 |
| 3,921,943 | 11/1975 | Munro et al. | 294/67 DA |

FOREIGN PATENT DOCUMENTS

| | | | |
|---|---|---|---|
| 1350981 | 12/1963 | France | 43/5 |
| 60401 | 1/1939 | Norway | 43/5 |

Primary Examiner—Stephen G. Kunin
Assistant Examiner—K. Bradford Adolphson
Attorney, Agent, or Firm—Jones, Tullar & Cooper

[57] ABSTRACT

A novel structure for a fish landing net, or basket, is provided wherein the net is defined by top and bottom C-shaped supports secured in spaced relationship by a plurality of longitudinal ribs. Corresponding ends of the C-shaped supports are secured together by parallel, spaced slider bars which define a slot opening into the interior of the fish landing net. The slider bars are adapted to receive a snap ring which is connectable around the two bars and is slidable thereon, to close the slot and to secure a fishing line within the net. The snap ring is secured to a lowering line by means of which the net may be lowered along the fishing line to encompass a fish hooked on the fishing line. A weight is provided on the snap ring so that when the landing net surrounds the fish, the weight will carry the snap ring downwardly along the slide bars past a shoulder formed in at least one of the bars, which prevents the ring from sliding back up the slide bars. When the snap ring reaches the bottom of the slide bars, tension on the lowering rope will upend the landing net, securing the fish and allowing it to be drawn up by means of the lowering rope rather than by means of the fishing line.

5 Claims, 8 Drawing Figures

FISH LANDING NET

BACKGROUND OF THE INVENTION

The present invention relates, in general, to fish landing nets or baskets, and more particularly to landing nets which are adapted to be lowered along a fishing line for recovery of a fish hooked thereon.

As is well known in the fishing art, it often happens that the fishing tackle used to hook a fish is too light to permit easy landing of the catch, particularly where the catch must be lifted out of the water so that the full weight of the catch is on the fishing line. In order to prevent breakage in such situations, landing nets of various designs have been devised. An example of such a net is illustrated in U.S. Pat. No. 2,921,397 wherein a landing net is provided with a zipper to allow entry of the fishing line into the center of the net so that it can be lowered over the catch.

Another example of the prior art is U.S. Pat. No. 1,797,251, which discloses a pair of spring-loaded ribs which apparently can be pried apart to allow the net to be positioned around a fishing line. A further example of the prior art is U.S. Pat. No. 2,782,546 wherein an open-sided landing net is provided with a rotatable ferrule which secures the sides of the net together and which is rotatable to allow a fishing line to pass into the net.

The prior art devices typified by the foregoing patents all suffer from the problem that they require considerable manipulation and require two hands to position them on the fishing line. When a fisherman is trying to maintain tension on the fishing line so as not to lose his catch while at the same time trying to position a landing net on the line, extreme difficulty is encountered with these devices, and for this reason, they have been found to be unsatisfactory.

SUMMARY OF THE INVENTION

The present invention is directed to a fish landing basket which may be easily and quickly secured around a fishing line so that the basket can be lowered with a minimum of delay, thereby increasing the chance of the fisherman retaining his catch. Such a device is of particular value when the fisherman is fishing from a bridge, pier, or the like, in an appreciable distance above the water, for in such circumstances a fishing line often is not strong enough to lift a hooked fish out of the water, particularly where the fish is of a large size. The basket of the invention is also extremely valuable where the fisherman desires to release his catch, for it avoids the need for a gaff, and allows safe and rapid landing of the fish for removal of the hook. In accordance with the invention, the basket is constructed with a pair of spaced, generally C-shaped supports which form the top and bottom of the landing net. The two supports are interconnected by a plurality of longitudinal ribs which shape the net and provide a relatively rigid frame for the device. The ribs may be spaced sufficiently close together to retain the fish, or may be used as supports for conventional netting material.

The open ends of the C-shaped supports are interconnected by means of a pair of parallel, spaced longitudinally extending slider bars, each bar extending between corresponding ends of the top and bottom C-shaped supports. The slider bars are free of support ribs or netting material and extend the full length of the net. Formed near the bottom end of each bar is an inwardly extending notch or shoulder. These parallel slider bars define a longitudinal slot in the side of the landing net extending from the top to the bottom thereof, the slot permitting the net to be easily positioned over a fishing line.

A snap ring or other quick-acting, snap-on fastener is provided for connection to the slide bars, the snap ring or fastener preferably being of the spring-load type which may be snapped over the two bars quickly and easily with one hand, so that the snap ring encircles the two bars and closes the slot to prevent the fishing line from leaving the basket. Secured to the snap ring is a weight and a suitable lowering line, the line preferably being of greater strength than the fishing line, and thus being capable of supporting both a hooked fish and the basket.

In operation, when a fish is hooked on a line, the basket is positioned over the line and the snap ring is placed around the slide bars near the top end of the basket, thereby enclosing the line within the net. The lowering line is then used to lower the net down along the fishing line until it reaches and encloses the fish, at which time the small upper end of the net is supported on the fish. Further release of the lowering line allows the weight on the snap ring to pull the snap ring down along the slide bars and over the notches, or shoulders, formed therein. At this point, tension can again be applied to the lowering rope and since the shoulder will prevent the slide ring from moving upwardly along the slide bars, the landing net will be upended, thereby trapping the fish and allowing it to be raised to the surface by means of the lowering line, rather than by the fishing line.

Thus, the present invention provides a simple arrangement for securing a landing net on a fishing line and for upending the net to allow a fish to be raised to the surface. The arrangement as illustrated herein overcomes the problems of prior art devices and thus presents a distinct improvement over that prior art.

BRIEF DESCRIPTION OF THE DRAWINGS

The foregoing and additional objects, features and advantages of the invention will become apparent from a consideration of the following descriptions of preferred embodiments thereof, taken in conjunction with the accompanying drawings, in which.

DESCRIPTION OF PREFERRED EMBODIMENTS

Figure 1:
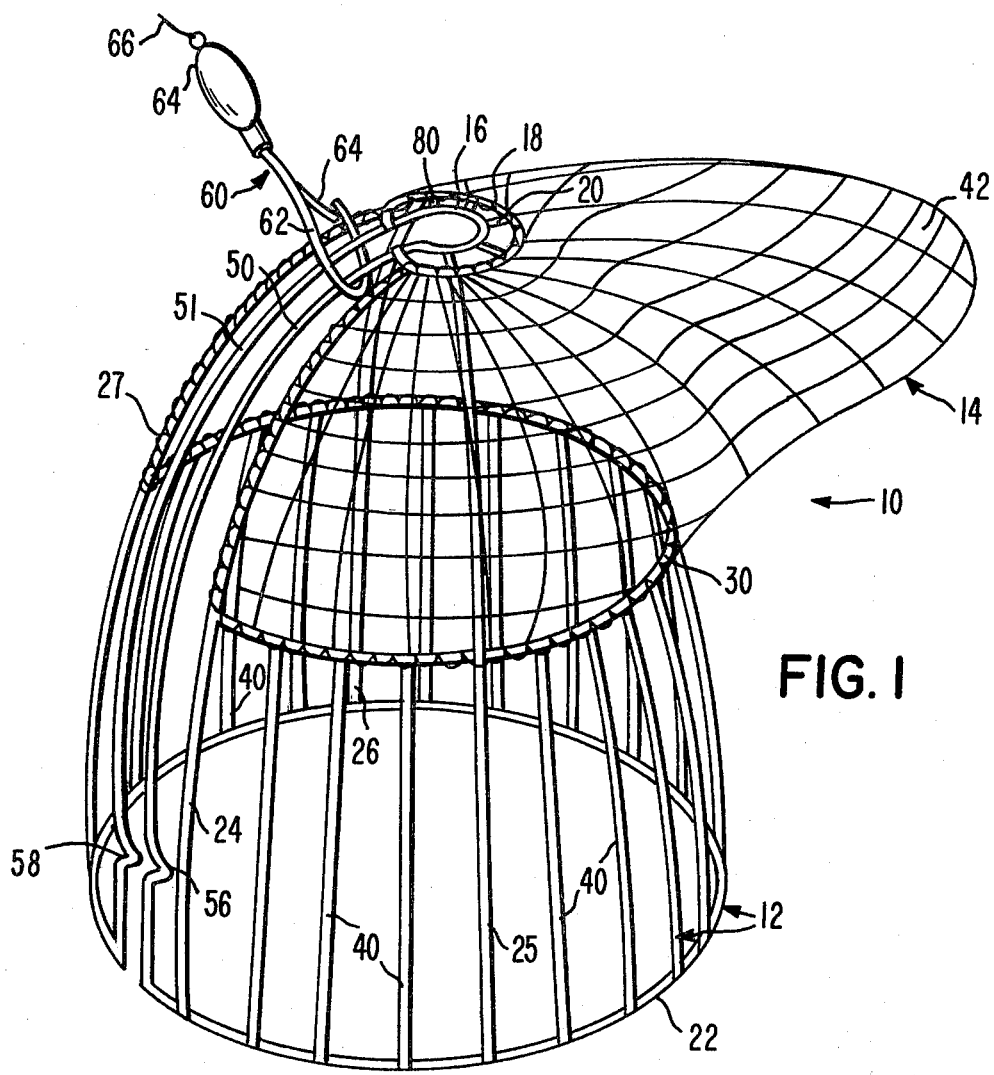
FIG. 1 is a perspective view of a preferred form of a fish landing basket constructed in accordance with the present invention.
Figure 2:
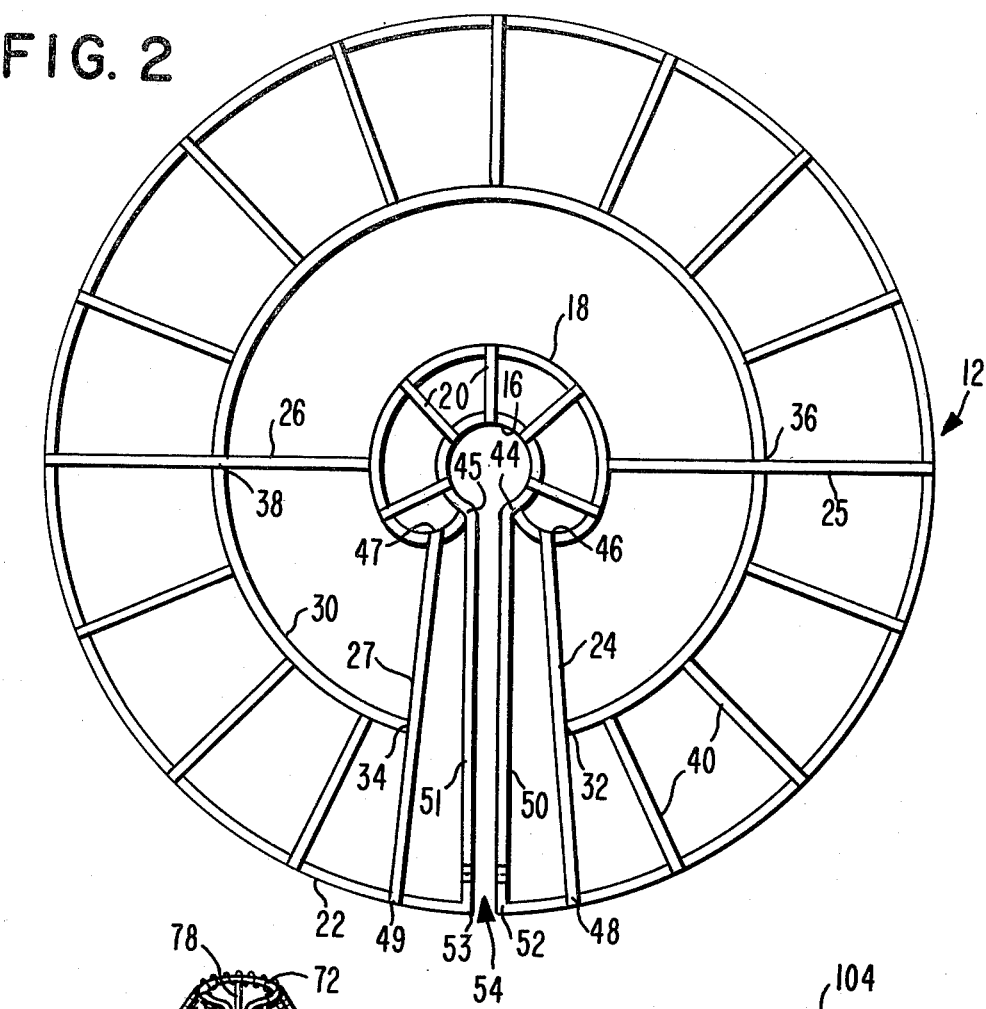
FIG. 2 is a top view of the framework for the landing basket of FIG. 1, with the netting material removed for clarity of illustration.

Turning now to a consideration of the drawings, there is generally illustrated at 10 in FIGS. 1 and 2, a fish landing basket having a relatively rigid wire framework 12 which may be at least partially covered by a netting material 14, the framework and netting material being shaped and sized to receive a hooked fish. The frame 12 includes a top support 16 which is generally C-shaped and which is sufficiently large to allow a fishing line and tackle to pass quickly through it but which is sufficiently small to prevent the basket from passing over a fish hooked on the line. In the embodiments of FIGS. 1 and 2, the support 16 is surrounded by a second, outwardly spaced C-shaped support 18 which is secured to the first support by means of a plurality of radially extending ribs 20, the two support members, and the radially extending ribs lying in plane to define the top of the fish landing net.

The bottom of the net is formed by a substantially rigid C-shaped support 22 which lies in a plane parallel to that of support 16 but is spaced therefrom by a distance which depends upon the size of the basket. A plurality of longitudinally extending ribs 24, 25, 26 and 27 are secured between supports 18 and 22, the ribs being curved outwardly as desired to shape the fish landing basket, to provide the desired interior space, and to provide the strength required to allow a large and heavy fish to be lifted by the frame.

Approximately midway between the top and the bottom supports of the basket frame is a C-shaped reinforcing ring 30 which is parallel to bottom support 22 and which extends peripherally around the frame, with its end portions being secured to the approximate midpoint of ribs 24 and 27, as indicated at joints 32 and 34, respectively, with intermediate portions of the reinforcing ring being connected to the approximate midpoints of ribs 25 and 26, as indicated at points 36 and 38, respectively, To complete the frame for the fish landing net basket, a plurality of longitudinal ribs 40 are provided, these ribs being fastened at their opposite ends to support ring 22 and reinforcing ring 30. The number of ribs 40 so provided will depend upon the size fish which are to be drawn up by the fish landing net. The space between reinforcing ring 30 and top support 18 is enclosed by the net material 14, the net being fabricated of any suitably flexible netting material. The edge of the net 14 is secured to C-shaped support 18 and reinforcing ring 30 at the top and bottom of the net, respectively, and to ribs 24 and 27 at the side edges thereof, as illustrated in FIG. 1. The net may be of any desired size and shape, and thus may be enlarged as indicated at portion 42 to receive a large fish. It will be noted, that longitudinal ribs 24 through 27 preferably extend the full length of the fish landing basket, but that they are so spaced as to leave an opening at the back of the device to accomodate the enlarged portion of the net 42.

Each of the supports 16, 18 and 22 as well as the reinforcing ring 30 are generally C-shaped and are so arranged that the open portions thereof face in about the same direction, as best shown in FIG. 2. As there illustrated, the open ends of the C-shaped support 18 are turned radially inwardly and are secured at 44 and 45 to the corresponding ends of C-shaped support 16. The longitudinal ribs 24 and 27 are secured at their upper ends near the ends of ring 18, at junction points 46 and 47, respectively, and extend downwardly and in generally parallel relationship. The lower ends of ribs 24 and 27 are connected at points 48 and 49 to ring 22 near the ends of the ring, whereby the ribs and open portions of the supports define an opening through the side of the frame. Located in the opening between ribs 24 and 27 is a pair of spaced, parallel slide bars 50 and 51 which are secured at their upper ends to corresponding ends 44 and 45 of support rings 16 and at their lower ends to the corresponding ends 52 and 53 of ring 22. The bars 50 and 51 are closely spaced to define an elongated slot 54 which extends the full length of the fish landing basket 10 and serves to admit a fishing line into the center of the basket so that the line can extend axially therethrough. An inwardly extending shoulder portion is formed near the bottom of each of the longitudinally extending slide bars 50 and 51, as illustrated in FIG. 1 at 56 and 58, respectively. These shoulders extend inwardly toward the central axis of the fish landing basket frame and preferably are formed simply by bending the bars 50 and 51.

The top and bottom support rings, the intermediate reinforcing ring, and the longitudinal ribs, which make up the frame 12 for the fish landing basket, are all constructed of relatively stiff stainless steel wire, in the preferred embodiment, whereby the frame is relatively rigid so that it will keep its shape for lowering over a fish, and will also be sufficiently strong to permit relatively large fish to be drawn up out of the water. In addition, the slide bars 50 and 51 are preferably formed from relatively stiff stainless steel wire.

The slot 54 is closable by means of a snap ring or spring-loaded clip 60 which includes a generally U-shaped arm 62 which is sufficiently large to extend around the two bars 50 and 51, as illustrated, and includes a spring arm 64 which engages the end of the curved arm 62 to secure the clip in place. The clip is secured to a suitable weight 64 which is sufficiently heavy to cause the clip to slide down the slide bars 50 and 51. The weight is secured, in turn, to a lowering line 66, by which the basket may be supported for lowering down over a fish hooked on a line, and by which the basket and the contained fish can be raised. When the line 66 is released after lowering the basket, the weight 64 will cause the clip 60 to slide down bars 50 and 51, with the arm 62 passing over shoulders 56 and 58. When the fish landing basket is then lifted by means of line 66, the shoulders 56 and 58 will prevent the clip from sliding back up bars 50 and 51, with the result that the basket is upended so that it will be lifted in its inverted position.

Figure 3:
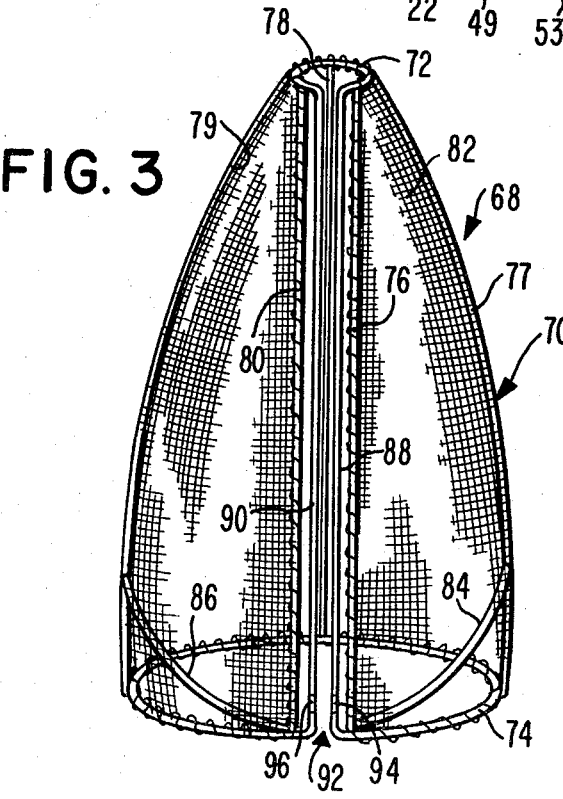
FIG. 3 is a perspective view of a second embodiment of the invention.

FIG. 3 illustrates at 68 another embodiment of the fish landing basket, wherein the frame portion 70 is formed with a top C-shaped support 72, a C-shaped bottom support 74 and a plurality of longitudinal ribs 76 to 80 secured between the top and bottom supports to form a strong and substantially rigid framework. The frame is covered by flexible netting material 82 which is secured to supports 72 and 74 and to ribs 76 and 80. To provide additional rigidity to the structure, braces 84 and 86 may be provided as required, these braces being illustrated as connected between bottom support 74 and ribs 77 and 79, respectively. Again, a pair of spaced parallel slide bars 88 and 90 are connected between corresponding ends of C-shaped support rings 72 and 74 to define a longitudinal slot 92. Shoulders 94 and 96 are provided near the bottom of the slide bars as previously described. The fish landing net of FIG. 3 has the advantage of being somewhat lighter in weight than the device of FIGS. 1 and 2, and thus is preferred for single hook rigs, but since it has more netting material, it presents a greater liklihood of tangling the hooks in a multi-hooking, whereas the ribs 40 in the device of FIG. 1 are less likely to produce such tangling.

Figure 4:
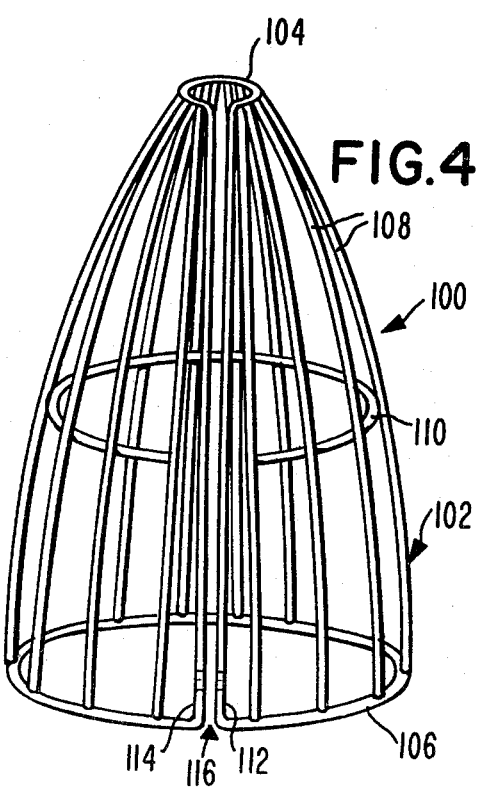
FIG. 4 is a perspective view of the framework for a third embodiment of the invention, with the netting material removed.

In another embodiment of the invention, the problem of tangling is further reduced by providing an all wire frame, as illustrated in FIG. 4. In this figure, the fish landing net 100 includes a frame 102 which incorporates top and bottom C-shaped supports 104 and 106, between which are connected a plurality of longitudinal ribs 108. A generally C-shaped reinforcing ring 110 may be secured to the midpoint of the longitudinal rib in the manner previously illustrated in FIG. 1. Here again, a pair of closely spaced, parallel slide bars 112 and 114 are connected between the corresponding ends of supports 104 and 106 to define a longitudinal slot 116.

It will be noted that in all embodiments of the invention, the slide bars are secured to the fish landing net only at the top and bottom ends so that the snap ring 60 is free to slide vertically along the slide bars without interference from the net material or from the support frame. It will also be understood that the slide bars are sufficiently heavy to insure that the basket will be suspended substantially vertically when supported by the snap ring. If necessary, weights can be added to the ribs or to the lower support to provide the desired balance.

Figures 5, 6, 7, 8:
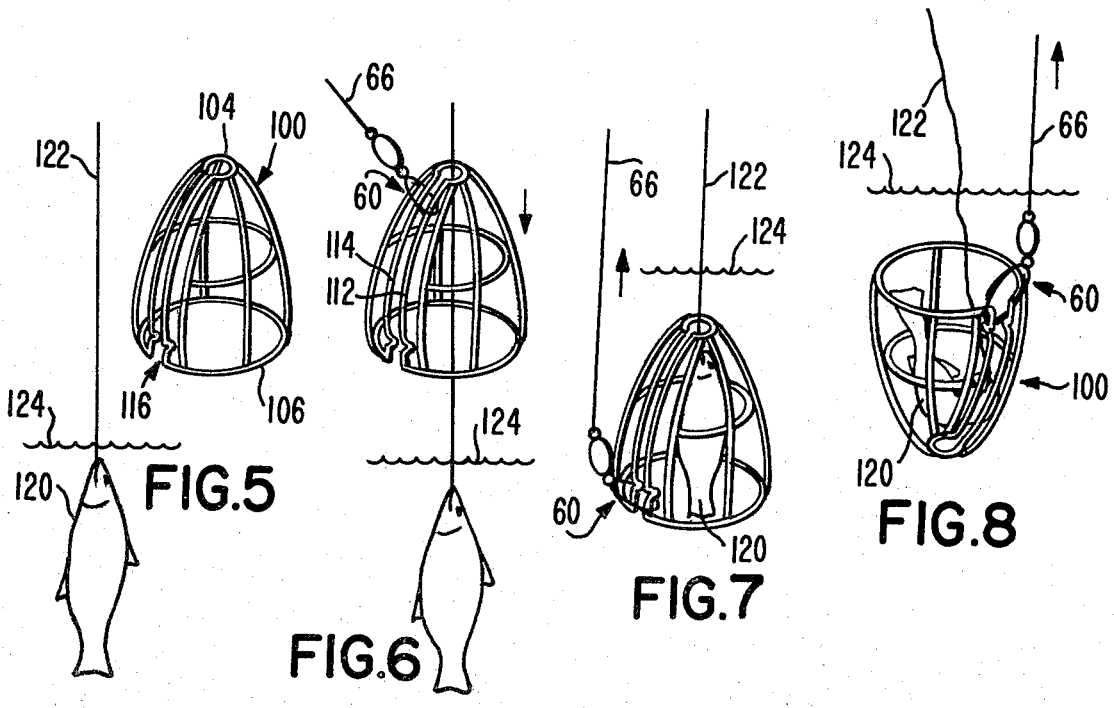
FIGS. 5 through 8 illustrate in a schematic manner the operation of the landing net of the present invention.

The use and operation of the fish landing net of the present invention is diagrammatically illustrated in FIGS. 5 through 8, wherein a fish 120 is shown as being supported on a fishing line 122 which may be of insufficient strength to lift the fish free of the water surface 124. The fish landing basket, for example the basket 100 of FIG. 4, is placed over the line by sliding the line through slot 116, thereby positioning the fishing line approximately axially within the basket 100, the line extending through the upper ring 104 and through the lower ring 106, generally as illustrated in FIG. 6. The snap ring 60 is then positioned over the slide bars 112 and 114 and the basket is lowered by means of lowering line 66 until it encloses fish 120. As indicated in FIG. 7, since the top ring 104 is smaller than the fish, the basket will come to a stop when it reaches the bottom of the fishing line, and continued lowering of line 66 will allow weight 64 to carry the snap ring to the bottom of slide bars 112 and 114. The snap ring will pass over the shoulders on the slide bar so that when a lifting force is applied to the line 66, the snap ring 60 will be prevented from sliding upwardly along the slide bars, but instead will invert basket 100, as illustrated in FIG. 8, trapping the fish and allowing it to be lifted free of the water without the need for applying tension to the fishing line 122.

Although the present invention has been described in terms of specific embodiments thereof, it will be understood that numerous variations and modifications can be made in the various features thereof without departing from the true spirit and scope thereof. Thus, for example, the top and bottom supports, although described as generally C-shaped, may take a variety of forms, as long as they have an open side which will cooperate with the slide bars to admit a fishing line to the interior of the basket. Further, the basket frame may be formed from stainless steel wire, plastic, or other materials having sufficient strength and being capable of withstanding corrosion. Thus, it is intended that the scope of the invention be limited only by the following claims.

What is claimed is:
1. A fish landing net comprising:
a frame including top and bottom supports and a plurality of rib means secured between said supports, said top and bottom supports each having an open portion and at least two of said plurality of rib means cooperating with said supports to define an opening into the interior of said net;
first and second spaced, parallel slide bars secured at opposite ends to said top and bottom supports and cooperating with the open portions of said supports to define a slot adapted to receive a fishing line and guide it into the center of the fish landing net;
clip means securable to and slidable on said slide bars to close said slot and secure a fishing line within said net; and
shoulder means at the bottom of at least one of said slide bars, said shoulder means being adapted to engage said clip means to prevent said clip means from sliding upwardly on said slide bars, whereby lowering of said clip means and subsequent raising thereof inverts said net.

2. The fish landing net of claim 1, wherein said top and bottom supports are generally C-shaped and have their open portions generally aligned with each other.

3. The fish landing net of claim 1, wherein said plurality of rib means comprise a plurality of longitudinally extending ribs spaced around the circumferences of said top and bottom supports to define an enclosed basket.

4. The fish landing net of claim 1, further including a netting material secured to said frame.

5. The fish landing net of claim 1, wherein said plurality of rib means comprise a plurality of longitudinally extending ribs, and further including netting material secured to said frame.

* * * * *